(12) United States Patent
Shen

(10) Patent No.: US 9,973,279 B2
(45) Date of Patent: May 15, 2018

(54) METHOD FOR ELIMINATING NONLINEAR EFFECTS, TRANSMITTER AND RECEIVER

(71) Applicant: ZTE CORPORATION, Guangdong (CN)

(72) Inventor: Bailin Shen, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days. days.

(21) Appl. No.: 15/039,503

(22) PCT Filed: Jul. 24, 2014

(86) PCT No.: PCT/CN2014/082957
§ 371 (c)(1),
(2) Date: May 26, 2016

(87) PCT Pub. No.: WO2015/078191
PCT Pub. Date: Jun. 4, 2015

(65) Prior Publication Data
US 2016/0380700 A1    Dec. 29, 2016

(30) Foreign Application Priority Data

Nov. 29, 2013    (CN) .......................... 2013 1 0628768

(51) Int. Cl.
*H04B 10/04*        (2006.01)
*H04B 10/58*        (2013.01)
*H04B 10/2543*      (2013.01)
*H04B 10/2513*      (2013.01)
*H04B 10/69*        (2013.01)

(52) U.S. Cl.
CPC ......... *H04B 10/58* (2013.01); *H04B 10/2543* (2013.01); *H04B 10/25137* (2013.01); *H04B 10/697* (2013.01); *H04B 2210/254* (2013.01)

(58) Field of Classification Search
CPC .............. H04B 10/58; H04B 10/25137; H04B 10/2543; H04B 10/697; H04B 2210/254; H04B 10/2507; H04B 10/2513
USPC ......................................................... 398/193
See application file for complete search history.

(56) References Cited

U.S. PATENT DOCUMENTS

2013/0136449 A1*  5/2013  Liu .................... H04B 10/2507
                                                            398/65

FOREIGN PATENT DOCUMENTS

| CN | 102332956 | 1/2012 |
| CN | 102655432 | 9/2012 |
| CN | 102655433 | 9/2012 |
| CN | 103178900 | 6/2013 |

OTHER PUBLICATIONS

International Search Report for PCT/CN2014/082957, dated Oct. 29, 2014, 4 pages.

* cited by examiner

*Primary Examiner* — M. R. Sedighian
(74) *Attorney, Agent, or Firm* — Nixon & Vanderhye P.C.

(57) ABSTRACT

The present disclosure discloses a method for eliminating nonlinear effects, a transmitter and a receiver. The method includes: setting signals to be transmitted and redundant signals, where the redundant signals are symmetrical to the signals, which are to be transmitted, about Y axis; and after the setting is completed, respectively executing dispersion pre-compensation on the signals to be transmitted and the redundant signals, and executing signal modulation after the dispersion pre-compensation is completed.

11 Claims, 4 Drawing Sheets

METHOD FOR ELIMINATING NONLINEAR EFFECTS, TRANSMITTER AND RECEIVER

This application is the U.S. national phase of International Application No. PCT/CN2014/082957 filed 24 Jul. 2014, which designated the U.S. and claims priority to CN Patent Application No. 201310628768.9 filed 29 Nov. 2013, the entire contents of each of which are hereby incorporated by reference.

TECHNICAL FIELD

The present disclosure relates to optical communication technologies, and particularly to a method for eliminating nonlinear effects, a transmitter and a receiver.

BACKGROUND

Limitation factors of optical transmission include attenuation, noise, dispersion, polarization mode dispersion, nonlinear effects, etc. Compensation or elimination technologies of nonlinear effects is always a hot research topic. Relatively practical methods include receiving-end digital reverse transmission method, sending-end perturbation pre-distortion method, etc.

In the digital reverse transmission method, dispersion compensation and nonlinear phase compensation are required to be alternately conducted for many times, the more the number of times, the more the power consumption, so that it is unbearable for chips; moreover, a phase adjustment factor in the nonlinear phase compensation is required to be optimally searched, which is difficult to implement. In the perturbation pre-distortion method, a system is required to configure related information to a transmitter, especially exponential integral functions of real numbers and imaginary numbers involved in a perturbation coefficient computation; moreover, the longer the system transmission distance, the more the involved perturbation terms, and the higher the operation difficulty.

Implementation of the above-mentioned nonlinear compensation method is very complicated, and performance improvement is limited. Generally, improvement of parameter Q corresponding to an error rate before error correction is not greater than 2 dB. Therefore, sectors of optical communication research and industry have been studying to seek better nonlinear compensation or nonlinear elimination technologies.

SUMMARY

To solve existing technical problems, embodiments of the present disclosure provide a method for eliminating nonlinear effects, a transmitter and a receiver.

Embodiments of the present disclosure provide a method for eliminating nonlinear effects applied to a transmitter, including:

setting signals to be transmitted and redundant signals, where the redundant signals are symmetrical to the signals, which are to be transmitted, about Y axis; and after the setting is completed, respectively executing dispersion pre-compensation on the signals to be transmitted and the redundant signals, and executing signal modulation after the dispersion pre-compensation is completed.

In the above-mentioned solution, a compensation amount for executing dispersion pre-compensation on the signals to be transmitted and the redundant signals is half as much as a total dispersion amount of a system.

In the above-mentioned solution, respectively executing dispersion pre-compensation on the signals to be transmitted and the redundant signals includes:

respectively executing dispersion pre-compensation on the signals to be transmitted and the redundant signals using time-domain dispersion compensation or frequency-domain dispersion compensation.

Embodiments of the present disclosure further provide a method for eliminating nonlinear effects applied to a receiver, including:

receiving signals and conducting data recovery, to obtain signals to be transmitted and redundant signals, where the redundant signals are symmetrical to the signals, which are to be transmitted, about Y axis;

after the signals to be transmitted and the redundant signals are obtained, respectively conducting data decision, aligning the redundant signals with the signals to be transmitted, and subtracting conjugate signals of the aligned redundant signals from the signals to be transmitted, so as to implement eliminating nonlinear effects on the signals to be transmitted; and conducting data decision on the signals to be transmitted on which nonlinear effects are eliminated.

In the above-mentioned solution, the receiver is a coherent receiver.

Embodiments of the present disclosure further provide a transmitter, including: a setting unit, a dispersion compensation unit and a modulation unit, where the setting unit is configured to set signals to be transmitted and redundant signals, where the redundant signals are symmetrical to the signals, which are to be transmitted, about Y axis;

the dispersion compensation unit is configured to respectively execute dispersion pre-compensation on the signals to be transmitted and the redundant signals after the setting unit completes the setting; and the modulation unit is configured to execute signal modulation after the dispersion compensation unit completes the dispersion pre-compensation.

In the above-mentioned solution, a compensation amount for executing dispersion pre-compensation on the signals to be transmitted and the redundant signals by the dispersion compensation unit is half as much as a total dispersion amount of a system.

In the above-mentioned solution, the dispersion compensation unit respectively executing dispersion pre-compensation on the signals to be transmitted and the redundant signals includes:

respectively executing dispersion pre-compensation on the signals to be transmitted and the redundant signals using time-domain dispersion compensation or frequency-domain dispersion compensation.

Embodiments of the present disclosure further provide a receiver, including: a receiving unit, a data recovery unit, a nonlinear effect elimination unit and a data decision unit, where the receiving unit is configured to receive signals;

the data recovery unit is configured to conduct data recovery, to obtain signals to be transmitted and redundant signals, where the redundant signals are symmetrical to the signals, which are to be transmitted, about Y axis;

the nonlinear effect elimination unit is configured to respectively conduct data decision after the data recovery unit obtains the signals to be transmitted and the redundant signals, align the redundant signals with the signals to be transmitted, and subtract conjugate signals of the aligned redundant signals from the signals to be transmitted, so as to implement eliminating nonlinear effects on the signals to be transmitted; and the data decision unit is configured to conduct data decision on the signals to be transmitted on which nonlinear effects are eliminated.

In the above-mentioned solution, the receiver is a coherent receiver.

Embodiments of the present disclosure further provide a computer readable storage medium, including a set of computer executable instructions, the instructions being used for executing a method for eliminating nonlinear effects at a transmitter side.

Embodiments of the present disclosure further provide a computer readable storage medium, including a set of computer executable instructions, the instructions being used for executing a method for eliminating nonlinear effects at a receiver side.

In conclusion, embodiments of the present disclosure are simpler than other existing nonlinear compensation methods in implementation, and are more excellent in performance.

DETAILED DESCRIPTION

Embodiments of the present disclosure will be explained in detail below in combination with the figures. It should be understood that embodiments described herein are only used for describing and explaining the present disclosure, but are not used for limiting the present disclosure.

Figure 1:
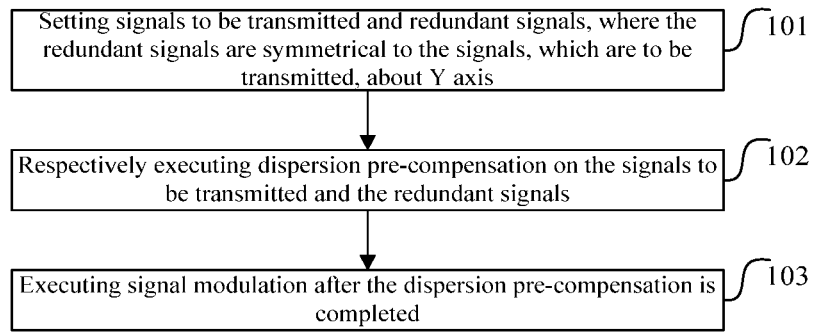
FIG. 1 is a flow diagram showing a method for eliminating nonlinear effects at a transmitter side in embodiments of the present disclosure.

As shown in FIG. 1, the method for eliminating nonlinear effects at a transmitter side in embodiments of the present disclosure includes:

Step 101: setting signals to be transmitted and redundant signals, where the redundant signals are symmetrical to the signals, which are to be transmitted, about Y axis.

The signals are polarization multiplexing signals different from those in conventional polarization multiplexing technologies, where polarization state signals X are signals Ex to be transmitted, polarization state signals Y are set as signals symmetrical to the signals Ex about Y axis, i.e. Ey=−real (Ex)+i*imag (Ex), where the real represents a real part of a complex number, and the imag represents an imaginary part of a complex number. Signal modulation code patterns are not limited.

Step 102: respectively executing dispersion pre-compensation on the signals to be transmitted and the redundant signals;

respectively executing dispersion pre-compensation on polarization state signals X and Y, where a compensation amount is half as much as a total dispersion amount of a system. The dispersion compensation may be time-domain dispersion compensation or frequency-domain dispersion compensation as well.

Step 103: executing signal modulation after the dispersion pre-compensation is completed.

Polarization multiplexing modulation is completely executed on signals on which dispersion pre-compensation is completed. Signal modulation is as same as that in a transmitter solution of a conventional optical communication system, that is, signal modulation, which is implemented using a digital analogue converter (DAC), is respectively executed on polarization state data X and Y, and then polarization multiplexing is conducted.

Figure 2:
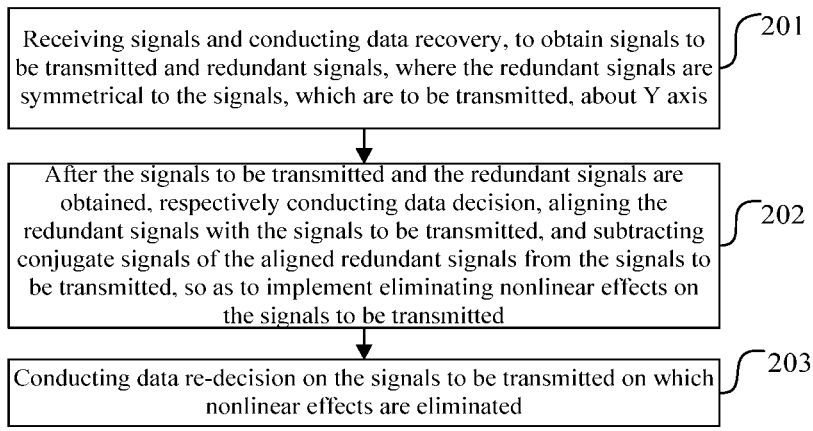
FIG. 2 is a flow diagram showing a method for eliminating nonlinear effects at a receiver side in embodiments of the present disclosure.

As shown in FIG. 2, the method for eliminating nonlinear effects at a receiver side in embodiments of the present disclosure includes:

Step 201: receiving signals and conducting data recovery, to obtain signals to be transmitted and redundant signals, where the redundant signals are symmetrical to the signals, which are to be transmitted, about Y axis;

recovering polarization state signals Ex(t) and Ey(t) according to a conventional correlation reception algorithm, where a dispersion compensation amount is half as much as a total dispersion amount of a system.

Data recovery is conducted using digital signals processing technologies. The correlation algorithm includes orthonormalization, time delay elimination, dispersion compensation, clock recovery, polarization demultiplexing, frequency prediction, phase prediction, etc. This step belongs to mature technologies of an existing optical communication system. After this step, polarization state signals X and Y: Ex(t) and Ey(t) are obtained.

Step 202: after the signals to be transmitted and the redundant signals are obtained, respectively conducting data decision, aligning the redundant signals with the signals to be transmitted, and subtracting conjugate signals of the aligned redundant signals from the signals to be transmitted, so as to implement eliminating nonlinear effects on the signals to be transmitted;

respectively conducting data decision on the Ex(t) and Ey(t), executing an aligning operation on the Ex and Ey after decision, where the T in Ey(t+t) is a time delay of signals Y relative to signals X, and nonlinear effects of the Ex(t) and Ey(t) have a correlation, and subtracting conjugate signals of signals Y from signals X finally implements elimination of nonlinear effects, so as to eliminate nonlinear effects through Es(t)=Ex(t)−(Ey(t+τ))*.

Step 203: conducting data re-decision on the signals to be transmitted on which nonlinear effects are eliminated.

Data decision is conducted on Es, where the data decision belongs to mature technologies of the existing optical communication system.

Figure 3:
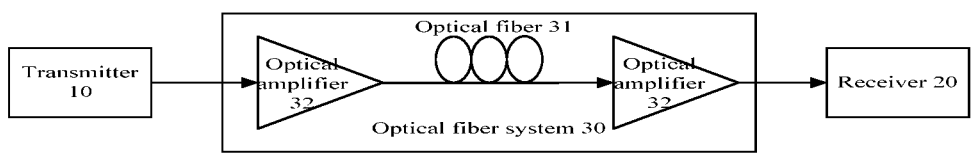
FIG. 3 is an architecture diagram showing an optical communication system in embodiments of the present disclosure.

As shown in FIG. 3, an optical communication system in embodiments of the present disclosure includes a transmitter 10, a receiver 20 and an optical fiber system 30, where the transmitter 10 implements signal redundancy processing, pre-compensates half dispersion of the system and completes polarization multiplexing modulation; the receiver 20 is a coherent receiver, and the receiver 20 implements signals recovery, conducts nonlinear de-correlation processing on two polarization state signals to implement elimination of nonlinear effects, and finally conducts decision on the signals on which nonlinear effects are eliminated. The optical fiber system 30 includes but are not limited to a plurality of optical fibers 31 and optical amplifiers 32, and may further include, for example, common multiplexers/demultiplexers and the like of a wavelength division multiplexing system, that is to say, the optical fiber system 30 is suitable for the existing optical communication system.

Sets redundant signals Ey at a sending end. The redundant signals are symmetrical to Ex about Y axis, and a volterra series theory may be adopted to conduct principle proofing. During transmission, the Ex and Ey have a correlation, so that it may be considered that nonlinear distortions of the Ex and conj(Ey) are completely the same. Therefore, nonlinear effects can be eliminated by subtraction of the Ex and conj(Ey) at the receiving end.

Figure 4:
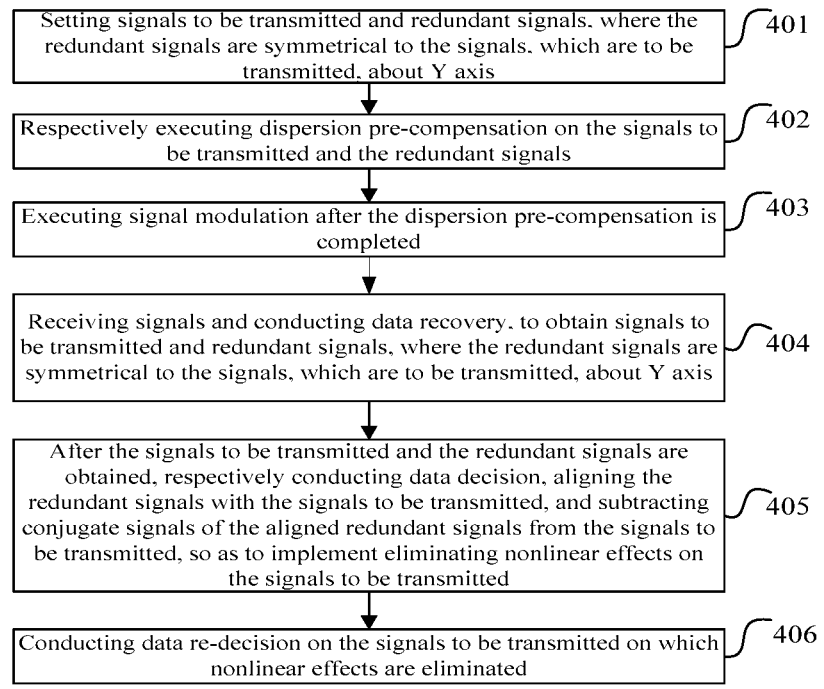
FIG. 4 is a flow diagram showing a method for eliminating nonlinear effects at a transmitter side and a receiver side in embodiments of the present disclosure.

As shown in FIG. 4, another embodiment of the method for eliminating nonlinear effects at a transmitter side and a receiver side of the present disclosure includes:

Step 401: setting signals to be transmitted and redundant signals, where the redundant signals are symmetrical to the signals, which are to be transmitted, about Y axis.

The signals are polarization multiplexing signals different from those in conventional polarization multiplexing technologies, where polarization state signals X are signals Ex to be transmitted, polarization state signals Y are set as signals symmetrical to the signals Ex about Y axis, i.e. Ey=−real (Ex)+i*imag (Ex), where the real represents a real part of a complex number, and the imag represents an imaginary part of a complex number. Signal modulation code patterns are not limited.

Step 402: respectively executing dispersion pre-compensation on the signals to be transmitted and the redundant signals;

respectively executing dispersion pre-compensation on polarization state signals X and Y, where a compensation amount is half as much as a total dispersion amount of a system. The dispersion compensation may be time-domain dispersion compensation or frequency-domain dispersion compensation as well.

Step 403: executing signal modulation after the dispersion pre-compensation is completed.

Polarization multiplexing modulation is completely executed on signals on which dispersion pre-compensation is completed. Signal modulation is as same as that in a transmitter solution of a conventional optical communication system, that is, signal modulation, which is implemented using a digital analogue converter (DAC), is respectively executed on polarization state data X and Y, and then polarization multiplexing is conducted.

Step 404: receiving signals and conducting data recovery, to obtain signals to be transmitted and redundant signals, where the redundant signals are symmetrical to the signals, which are to be transmitted, about Y axis;

recovering polarization state signals Ex(t) and Ey(t) according to a conventional correlation reception algorithm, where a dispersion compensation amount is half as much as a total dispersion amount of a system.

Data recovery is conducted using digital signals processing technologies. The correlation algorithm includes orthonormalization, time delay elimination, dispersion compensation, clock recovery, polarization demultiplexing, frequency prediction, phase prediction, etc. This step belongs to mature technologies of an existing optical communication system. After this step, polarization state signals X and Y: Ex(t) and Ey(t) are obtained.

Step 405: after the signals to be transmitted and the redundant signals are obtained, respectively conducting data decision, aligning the redundant signals with the signals to be transmitted, and subtracting conjugate signals of the aligned redundant signals from the signals to be transmitted, so as to implement eliminating nonlinear effects on the signals to be transmitted;

respectively conducting data decision on the Ex(t) and Ey(t), executing an aligning operation on the Ex and Ey after decision, where the T in Ey(t+t) is a time delay of signals Y relative to signals X, and nonlinear effects of the Ex(t) and Ey(t) have a correlation, and subtracting conjugate signals of signals Y from signals X finally implements elimination of nonlinear effects, so as to eliminate nonlinear effects through $Es(t)=Ex(t)-(Ey(t+\tau))^*$.

Step 406: conducting data re-decision on the signals to be transmitted on which nonlinear effects are eliminated.

Data decision is conducted on Es, where the data decision belongs to mature technologies of the existing optical communication system.

Figure 5:
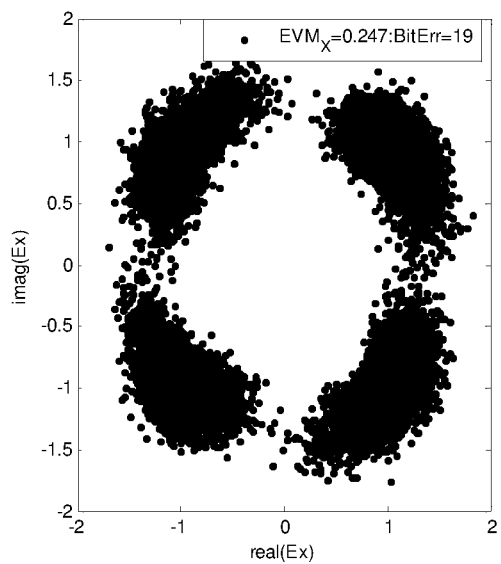
FIGS. 5-7 are effect diagrams showing embodiments of the present disclosure.
Figure 6:
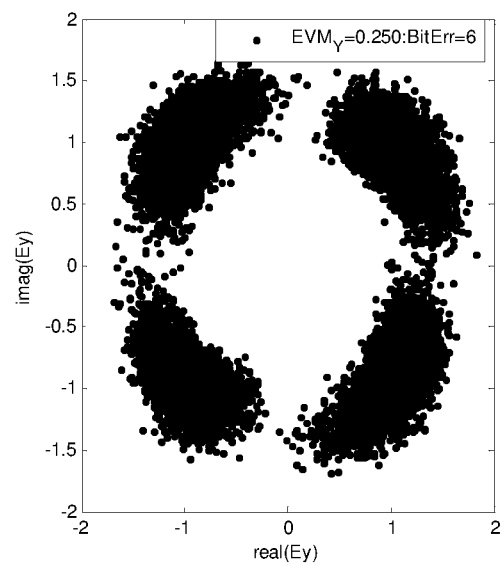
Figure 7:
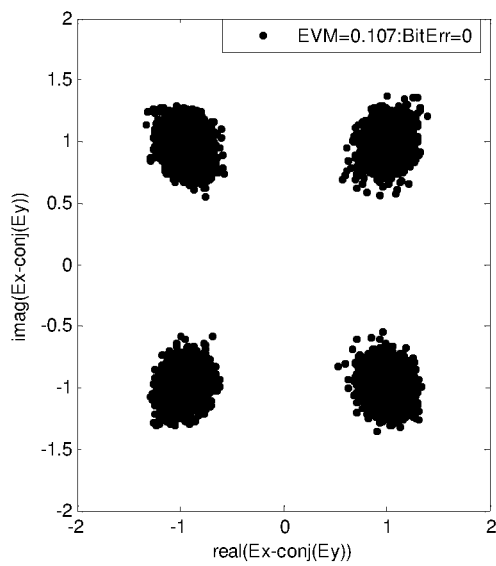

FIGS. 5-7 show simulation result examples of eliminating nonlinear effects using embodiments of the present disclosure, using a G652 optical fiber system having a modulation code pattern of polarization-division multiplexing-quadrature phase shift keying (PDM-QPSK) and a symbol rate of a single polarization signals of 10 Gbd, where FIG. 5 is a constellation diagram showing polarization state signals X, FIG. 6 is a constellation diagram showing polarization state signals Y, and FIG. 7 is a constellation diagram showing Ex-conj(Ey), where the conj represents conjugate, and the real represents a real part of a complex signal, and the imag represents an imaginary part of a complex signal. It is not hard to see from the Figures that an error vector magnitude (EVM) of a single polarization state signal X and a single polarization state signal Y is about 0.25-0.26. The error vector magnitude of signals on which nonlinear effects are eliminated is reduced to 0.12, and an error bit number is 0, so that system transmission performance is substantially improved.

Figure 8:
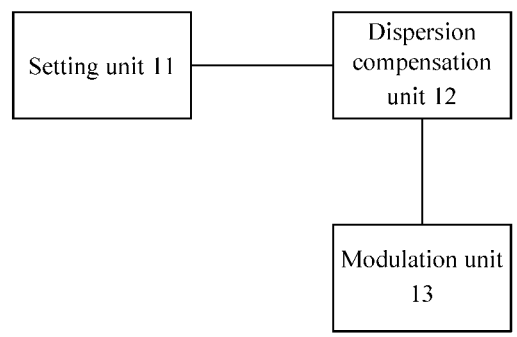
FIG. 8 is an architecture diagram showing a transmitter in embodiments of the present disclosure.

As shown in FIG. 8, embodiments of the present disclosure further provide a transmitter, including: a setting unit 11, a dispersion compensation unit 12 and a modulation unit 13, where the setting unit 11 is configured to set signals to be transmitted and redundant signals, where the redundant signals are symmetrical to the signals, which are to be transmitted, about Y axis;

the dispersion compensation unit 12 is configured to respectively execute dispersion pre-compensation on the signals to be transmitted and the redundant signals after the setting unit completes the setting; and the modulation unit 13 is configured to execute signal modulation after the dispersion compensation unit completes the dispersion pre-compensation.

A compensation amount for executing dispersion pre-compensation on the signals to be transmitted and the redundant signals by the dispersion compensation unit 12 is half as much as a total dispersion amount of a system.

The dispersion compensation unit 12 respectively executing dispersion pre-compensation on the signals to be transmitted and the redundant signals includes: respectively executing dispersion pre-compensation on the signals to be transmitted and the redundant signals using time-domain dispersion compensation or frequency-domain dispersion compensation.

It should be noted that the setting unit 11, the dispersion compensation unit 12 and the modulation unit 13 may be implemented by a central processing unit (CPU), a micro processing unit (MPU), a digital signals processor (DSP) or a field-programmable gate array (FPGA) in the transmitter.

Figure 9:
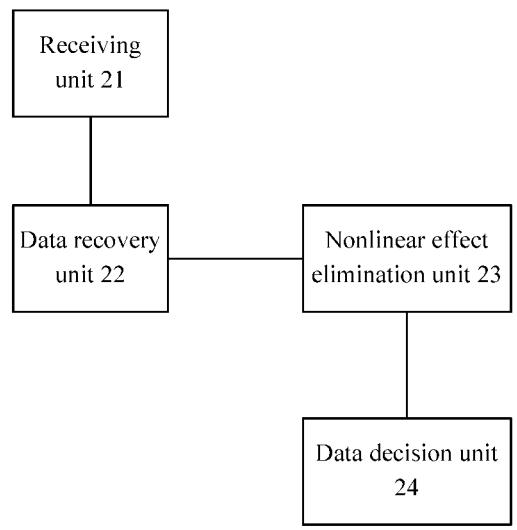
FIG. 9 is an architecture diagram showing a receiver in embodiments of the present disclosure.

As shown in FIG. 9, embodiments of the present disclosure further provide a receiver, including: a receiving unit 21, a data recovery unit 22, a nonlinear effect elimination unit 23 and a data decision unit 24, where the receiving unit 21 is configured to receive signals;

the data recovery unit 22 is configured to conduct data recovery, to obtain signals to be transmitted and redundant signals, where the redundant signals are symmetrical to the signals, which are to be transmitted, about Y axis;

the nonlinear effect elimination unit 23 is configured to respectively conduct data decision after the data recovery unit obtains the signals to be transmitted and the redundant signals, align the redundant signals with the signals to be transmitted, and subtract conjugate signals of the aligned redundant signals from the signals to be transmitted, so as to implement eliminating nonlinear effects on the signals to be transmitted; and the data decision unit 24 is configured to conduct data decision on the signals to be transmitted on which nonlinear effects are eliminated.

The receiver in embodiments of the present disclosure may be a coherent receiver.

It should be noted that the receiving unit 21 may be implemented by a communication function chip of the receiver, and the data recovery unit 22, the nonlinear effect elimination unit 23 and the data decision unit 24 may be implemented by an CPU, an MPU, an DSP or an FPGA of the receiver.

Embodiments of the present disclosure further provide a computer readable storage medium including a set of computer executable instructions, which are used for executing a method for eliminating nonlinear effects at a transmitter side.

Embodiments of the present disclosure further provide a computer readable storage medium including a set of computer executable instructions, which are used for executing a method for eliminating nonlinear effects at a receiver side.

Those skilled in the art should understand that various modules or various steps of the present disclosure can be implemented using a universal computation device, and they can be centralized on a single computation device or distributed on a network formed by a plurality of computation devices as well. Optionally, they can be implemented using program codes capable of being executed by the computation device, so that they can be stored in the a storage device and then executed by the computation device, and in some cases can be implemented by executing the shown or described steps in a sequence different from those herein, or the steps of respectively manufacturing them into various integrated circuit modules, or the steps of manufacturing a plurality of modules thereof into single integrated circuit modules.

The invention claimed is:

1. A method for eliminating nonlinear effects applied to a transmitter, comprising:
   setting signals to be transmitted and redundant signals, wherein the redundant signals are symmetrical to the signals, which are to be transmitted, about Y axis; and
   respectively executing dispersion pre-compensation on the signals to be transmitted and the redundant signals after the setting is completed, and executing signal modulation after the dispersion pre-compensation is completed.

2. The method of claim 1, wherein a compensation amount for executing dispersion pre-compensation on the signals to be transmitted and the redundant signals is half as much as a total dispersion amount of a system.

3. The method of claim 2, wherein respectively executing dispersion pre-compensation on the signals to be transmitted and the redundant signals comprises:
   respectively executing dispersion pre-compensation on the signals to be transmitted and the redundant signals using time-domain dispersion compensation or frequency-domain dispersion compensation.

4. A non-transitory computer readable storage medium comprising a set of computer executable instructions, which are used for executing the method for eliminating nonlinear effects of claim 3.

5. A non-transitory computer readable storage medium comprising a set of computer executable instructions, which are used for executing the method for eliminating nonlinear effects of claim 2.

6. The method of claim 1, wherein respectively executing dispersion pre-compensation on the signals to be transmitted and the redundant signals comprises:
   respectively executing dispersion pre-compensation on the signals to be transmitted and the redundant signals using time-domain dispersion compensation or frequency-domain dispersion compensation.

7. A non-transitory computer readable storage medium comprising a set of computer executable instructions, which are used for executing the method for eliminating nonlinear effects of claim 6.

8. A non-transitory computer readable storage medium comprising a set of computer executable instructions, which are used for executing the method for eliminating nonlinear effects of claim 1.

9. A transmitter, comprising: a setting unit, a dispersion compensation unit and a modulation unit, wherein
   the setting unit is configured to set signals to be transmitted and redundant signals, wherein the redundant signals are symmetrical to the signals, which are to be transmitted, about Y axis;
   the dispersion compensation unit is configured to respectively execute dispersion pre-compensation on the signals to be transmitted and the redundant signals after the setting unit completes the setting; and
   the modulation unit is configured to execute signal modulation after the dispersion compensation unit completes the dispersion pre-compensation.

10. The transmitter of claim 9, wherein a compensation amount for executing dispersion pre-compensation on the signals to be transmitted and the redundant signals by the dispersion compensation unit is half as much as a total dispersion amount of a system.

11. The transmitter of claim 9, wherein the dispersion compensation unit respectively executing dispersion pre-compensation on the signals to be transmitted and the redundant signals comprises:
   respectively executing dispersion pre-compensation on the signals to be transmitted and the redundant signals using time-domain dispersion compensation or frequency-domain dispersion compensation.

* * * * *